(12) United States Patent
Song

(10) Patent No.: US 6,983,064 B2
(45) Date of Patent: Jan. 3, 2006

(54) METHOD AND APPARATUS FOR VISUALIZATION AND MANIPULATION OF REAL 3-D OBJECTS IN NETWORKED ENVIRONMENTS

(76) Inventor: Samuel Moon-Ho Song, School of Mechanical and Aerospace Engineering Seoul National University, Seoul (KR) 151-742

( * ) Notice: Subject to any disclaimer, the term of this patent is extended or adjusted under 35 U.S.C. 154(b) by 185 days.

(21) Appl. No.: 09/873,056

(22) Filed: Jun. 1, 2001

(65) Prior Publication Data

US 2003/0031380 A1  Feb. 13, 2003

Related U.S. Application Data

(60) Provisional application No. 60/285,044, filed on Apr. 19, 2001.

(51) Int. Cl.
*G06K 9/00* (2006.01)

(52) U.S. Cl. ........................... 382/131; 345/419
(58) Field of Classification Search ............... 382/128, 382/129, 130, 131, 132, 133, 232, 240, 154, 382/114; 345/9, 418, 419; 348/42, 44; 600/437, 600/558

See application file for complete search history.

(56) References Cited

U.S. PATENT DOCUMENTS

| | | | | |
|---|---|---|---|---|
| 6,012,067 A | * | 1/2000 | Sarkar | 707/103 R |
| 6,028,907 A | * | 2/2000 | Adler et al. | 378/4 |
| 6,477,267 B1 | * | 11/2002 | Richards | 382/154 |
| 6,507,618 B1 | * | 1/2003 | Wee et al. | 375/240.16 |
| 6,511,426 B1 | * | 1/2003 | Hossack et al. | 600/437 |
| 6,513,069 B1 | * | 1/2003 | Abato et al. | 709/238 |

* cited by examiner

*Primary Examiner*—Kanjibhai Patel
*Assistant Examiner*—Abolfazl Tabatabai
(74) *Attorney, Agent, or Firm*—Joseph Hyosuk Kim; JHK Law

(57) ABSTRACT

A new method and apparatus for visualization and manipulation of real 3-D objects are disclosed. This new approach utilizes compressed digital video taking advantage of modern video compression technology. The entire system consists of the image acquisition device, the viewing/manipulation program and the 3-D image database. The system first captures images of the object from all possible view angles as a sequence of images (a video). As neighboring images within the sequence will generally be similar, the sequence will be amenable to standard video compression techniques such as MPEG. The acquired video data (rendition of a real 3-D object) is then stored into a database for later access, for instance, over the Internet.

Through specially developed software, the stored data can be manipulated while viewing the object. The user simply inputs—via a mouse, for instance—the view angle and the software automatically displays the appropriate frame within the video (stored data). The software allows various object manipulations such as rotation in arbitrary direction, as well as zoom, pan, etc. A particular implementation of the viewing program using a Pentium III processor, randomly accessing an MPEG sequence, through pre-decoding of certain anchor frames, is able to decode fast enough for users to perform real-time manipulation of the object.

The captured 3-D image data of an object is stored into a centralized (or distributed) database and users may access the data through the assigned URL for the object over the Internet. The data may or may not be password protected. As such, the overall system is an implementation of a one-stop service for individuals wishing to provide 3-D visualization of real 3-D objects over the Internet.

80 Claims, 12 Drawing Sheets

METHOD AND APPARATUS FOR VISUALIZATION AND MANIPULATION OF REAL 3-D OBJECTS IN NETWORKED ENVIRONMENTS

RELATED APPLICATION

This application claims the benefit of co-pending U.S. Provisional Application No. 60/285,044, filed on Apr. 19, 2001, entitled "Method and Apparatus for Visualization of Real 3-D Objects in Networked Environments."

BACKGROUND OF THE INVENTION

I. Technical Field

This invention relates generally to visualization. More particularly, this invention relates to visualization and manipulation of a real 3-D object using image acquisition and video compression.

II. Description of the Related Art

The essential goal of visualizing a real 3-D object is to render an image of the object depending on the user's view angle. Traditionally, this has been in the realm of computer graphics where images are rendered based on object models, be it mesh or otherwise. The trouble with this existing paradigm is that the rendering process is computationally expensive. Although there exist sub-optimal methods that can speed up the rendering process, these are basically based on approximations such as enlarging the grid/mesh elements. These approaches naturally result in rendered images that are less-than-real, especially for natural complex objects that are difficult to model.

Most of conventional visualization paradigms follow essentially a two-step process: modeling and rendering. First, the modeling step involves the extraction and storage of parameters describing the object. Second, the rendering step renders the image (preferably in real-time) based on the stored object parameters as the user requests a certain view of the object. Although the modeling step may be performed off-line and thus is amenable to extremely complicated algorithms, the rendering step must be performed real-time for realistic manipulation of objects. However, in general, the rendering process for natural complex objects cannot be performed on the client side, as most clients on the Web are PCs with limited computational bandwidth. The placement of the rendering step on the server side (e.g., a supercomputer) does not solve the problem either, as it will limit the number of simultaneous rendering requests the server may be able to service.

SUMMARY OF THE INVENTION

Accordingly, an object of the present invention is to provide a new visualization technique that is computationally efficient for use in network environments.

Another object is to provide real-time manipulation of a real 3-D object during visualization over a network such as the Internet.

The present invention replaces the modeling step with an image acquisition step and a rendering step with a simple video decompression step. All computationally demanding portions (as well as manual efforts in extracting the modeling parameters) that exist in conventional visualization approaches have been eliminated. As such, the user may view and manipulate natural real 3-D objects in real time over the Internet. The server (with the 3-D data) in this case simply transmits the data to the requesting client.

DETAILED DESCRIPTION OF THE INVENTION

A. IMAGE ACQUISITION DEVICE

Figure 1:
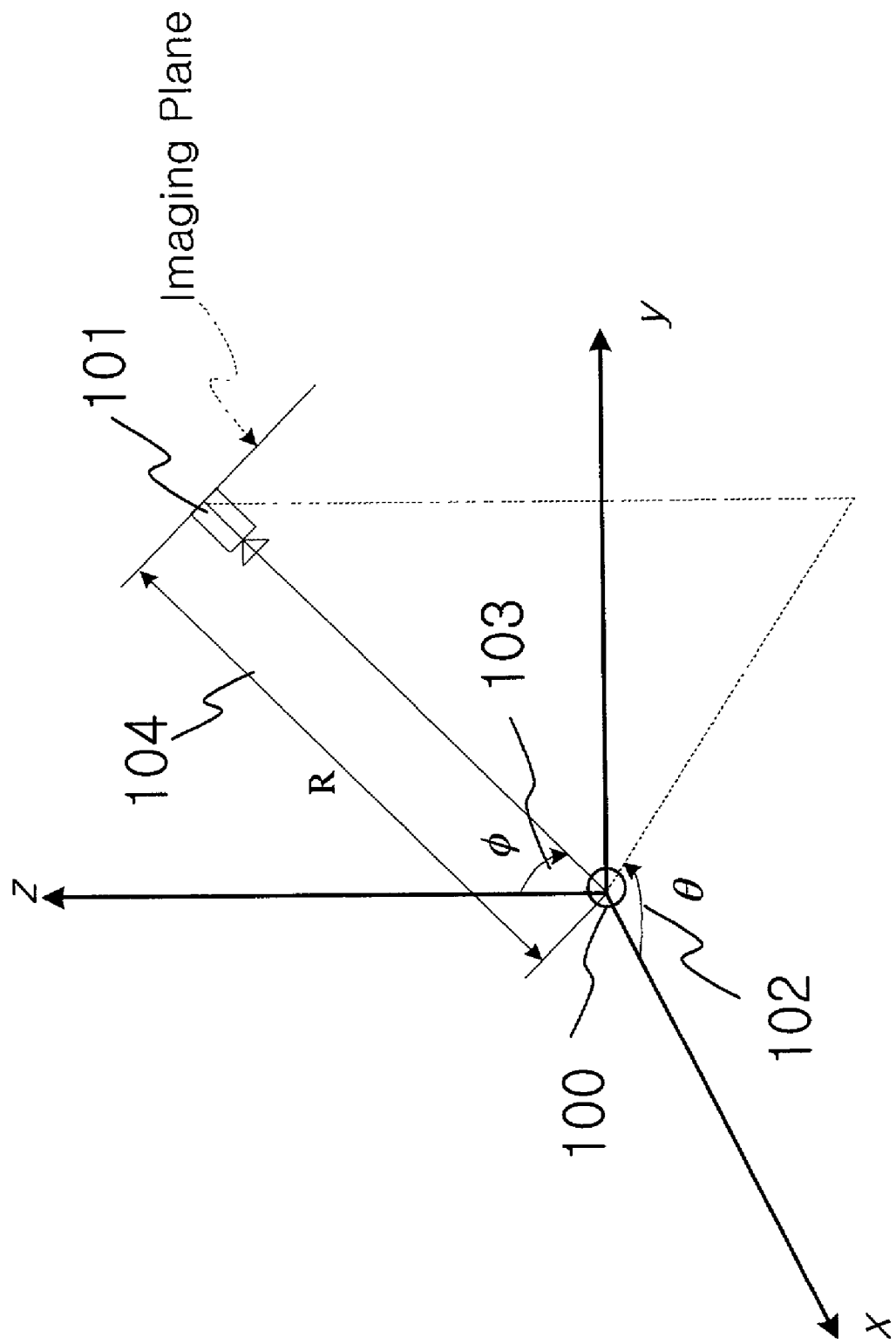
FIG. 1 shows the geometry of an image acquisition device.

FIG. 1 shows the geometry of the image acquisition device. The object 100 is placed in the center (origin) and the camera 101 rotates about the object to capture images at various prescribed angle $\theta$ 102 and $\phi$ 103 at distance R 104, where $\theta$ 102 is an azimuth in the horizontal plane and $\phi$ 103 is an elevation from the horizontal plane. However, in order to reproduce the image of the object at a particular view angle that the user may request, the object must be imaged from "all possible view angles". The definition of "all possible view angles" can be realized by drawing a subset of all possible rays ("all possible view angles") from the origin.

Figure 2:
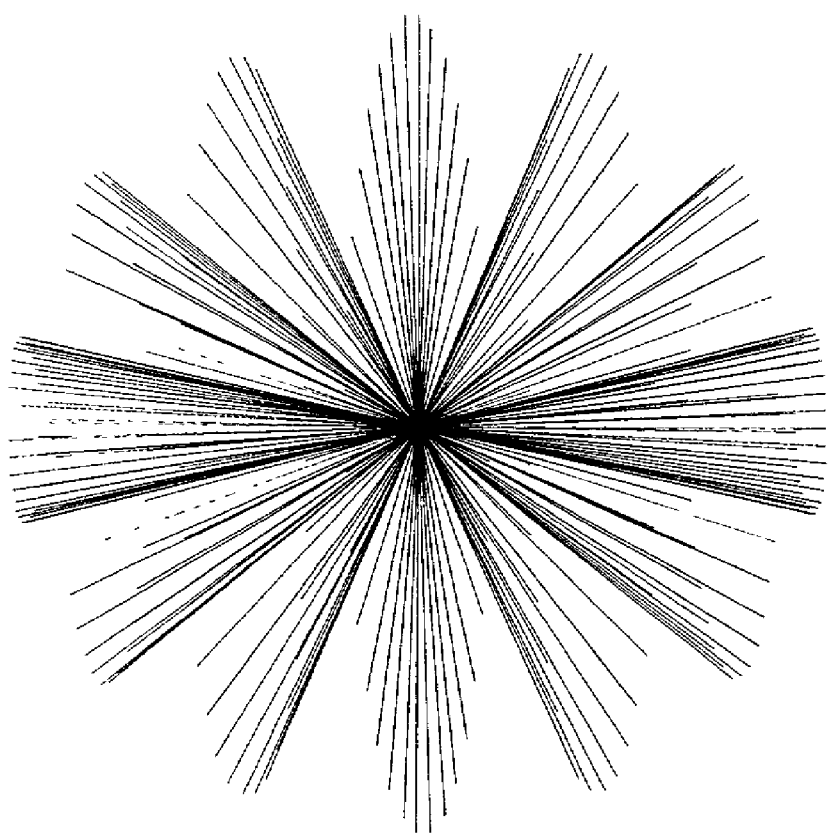
FIG. 2 is an illustration of a "fuzz ball", a collection of all rays from the camera position to the origin.

FIG. 2 shows a "fuzz-ball" formed by all such rays viewed together. In the figure, $\theta$ and $\phi$ are sampled as $\theta = 2\pi m/32$ and $\phi = (0.5+n)\pi/7$, where m=0,1,K,31 and n=0,1,K,6. Notice that the ray spacing basically controls the viewing resolution, in the corresponding direction $\theta$ and $\phi$. The viewing resolution determines the smoothness while rotating the view angle, by changing $\theta$ and $\phi$ by the mouse action.

As the camera will be required take pictures at a point from each of the rays pointing towards the center, the camera will be required move about a surface enclosing the object. The optimal surface, in the sense of minimizing the distance traveled by the camera, is therefore the surface enclosing the object with the smallest surface area. As the camera must be placed away from the object, say at a fixed distance R from the origin, the optimal surface is a sphere with radius R. If the object is imaged from all points on the surface (with camera pointing towards the origin), this amounts to having imaged the object from "all possible view angles".

Although it has been established that the sphere with radius R is the optimal surface, it is still necessary to parameterize and discretize the view angles $\theta$ 102 and $\phi$ 103. The parameterized angles, e.g., $\theta(t)$ and $\phi(t)$, $0 \leq t \leq T$, where T is the total capture time, dictate the camera path. The discretization of the view angles, say $\theta_k$ and $\phi_k$, k=0,1,K, N−1, keeps the number of images in the sequence (video) finite. The two angle sequences, $\theta_k$ and $\phi_k$, k=0,1,K,N−1, establish the camera path uniquely and must be designed efficiently to keep the imaging time short. As the location of the camera is kept fixed at R 104 from the origin, it would best if the camera motion covers the surface of the sphere of radius R 104 in a single sweep. Three such designs are presented.

1. Slice Sampling Strategy

Figure 3B:
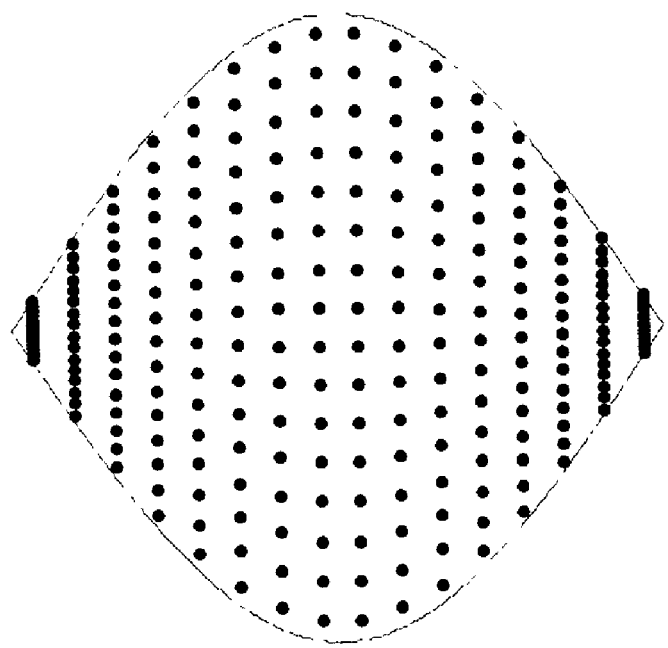
FIGS. 3A and 3B are illustrations of image capture locations for a slice sampling strategy.
Figure 3A:
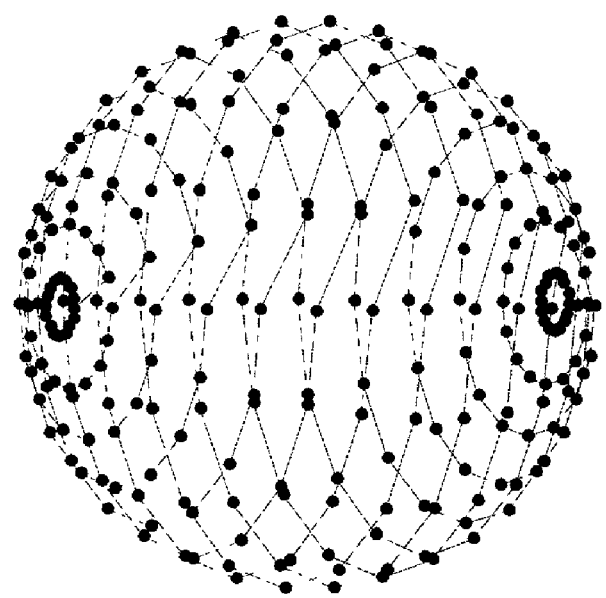

FIG. 3A shows one possible path that the camera may traverse to cover the sphere with radius R in a single sweep. FIG. 3B shows the 3-D plot of FIG. 3A mapped to a flat surface using the Sanson projection, often used for geographical mapping applications. The dots in the figure indicate the image capture locations where the images are acquired with the camera pointing directly towards the origin.

Let $N_\theta$ and $N_\phi$ denote the average (or exact) number of frames captured within the range [0,2π] and [0,π], respectively. Note that $N_\theta$ and $N_\phi$ need not be integers. Then, the total number of acquired images $N \approx N_\theta N_\phi$. Consider the following image acquisition locations:

$$\theta_k = \theta_o + \frac{2\pi k}{N_\theta}, k = 0, 1, K, N - 1 \quad (1)$$

$$\phi_k = \phi_o + \frac{\pi \lfloor k/N_\theta \rfloor}{N_\phi}, k = 0, 1, K, N - 1 \quad (2)$$

where the operator $\lfloor \cdot \rfloor$ denotes the floor operation, which takes the greatest integer less than or equal to the argument. As such, $N_\theta$ and $N_\phi$ set the viewing resolutions for the direction along θ and φ, respectively. For instance, $N_\theta = N_\phi$ implies equal step size in both θ and φ. FIG. 3A and FIG. 3B show the result of using capture locations of Eqns. (1) and (2).

The most convenient motor control here would be to rotate θ at a constant angular speed and rotate φ in discrete steps of $\pi/N_\phi$. Thus, as T is the time required for capturing N frames, the two motor are controlled according to $$\theta(t) = \theta_o + \frac{2\pi t}{T_\theta}, 0 \leq t \leq T \quad (3)$$

$$\phi(t) = \phi_o + \frac{\pi \lfloor t/T_\theta \rfloor}{N_\phi}, 0 \leq t \leq T \quad (4)$$

where $T_\theta$ is the time taken for the camera to rotate one revolution in θ direction. Thus, if the two motors are controlled according to Eqns. (3) and (4), and the image acquisition times are taken as:

$$t = \frac{T_\theta}{N_\theta} k, k = 0, 1, 2, K, N - 1 \quad (5)$$

the image capture points are exactly the ones given by Eqns. (1) and (2). FIG. 3A and FIG. 3B show the capture angles where the dots indicate the actual image capture positions of the camera. FIG. 3A shows the 3-D trajectory (line) which is marked (dots) with all image capture locations, and FIG. 3B shows all capture locations mapped using the Sanson projection (see text). The parameters used are: $(N_\theta, N_\phi) = (16, 16)$ and $(\theta_0, \phi_0) = (0, \pi/(2N_\phi))$. Thus, there are a total of 256 ($=N=N_\theta N_\phi$) frames captured with this method.

2. Anisotropic Spiral Sampling Strategy

Motor control according to Eqns. (3) and (4) unfortunately has steps in φ for each revolution along the direction θ. In practice, the control of the motor in such manner is difficult, especially when it is time critical. The removal of this step results in the following equations for motor control:

$$\theta(t) = \theta_o + \frac{2\pi t}{T_\theta}, 0 \leq t \leq T \quad (6)$$

$$\phi(t) = \phi_o + \frac{\pi t/T_\theta}{N_\phi}, 0 \leq t \leq T \quad (7)$$

Taking the image acquisition times given by Eqn. (5) with the motor control according to Eqns. (6) and (7) yields the following image capture locations:

$$\theta_k = \theta_o + \frac{2\pi k}{N_\theta}, k = 0, 1, K, N - 1 \quad (8)$$

$$\phi_k = \phi_o + \frac{\pi k/N_\theta}{N_\phi}, k = 0, 1, K, N - 1 \quad (9)$$

Figure 4B:
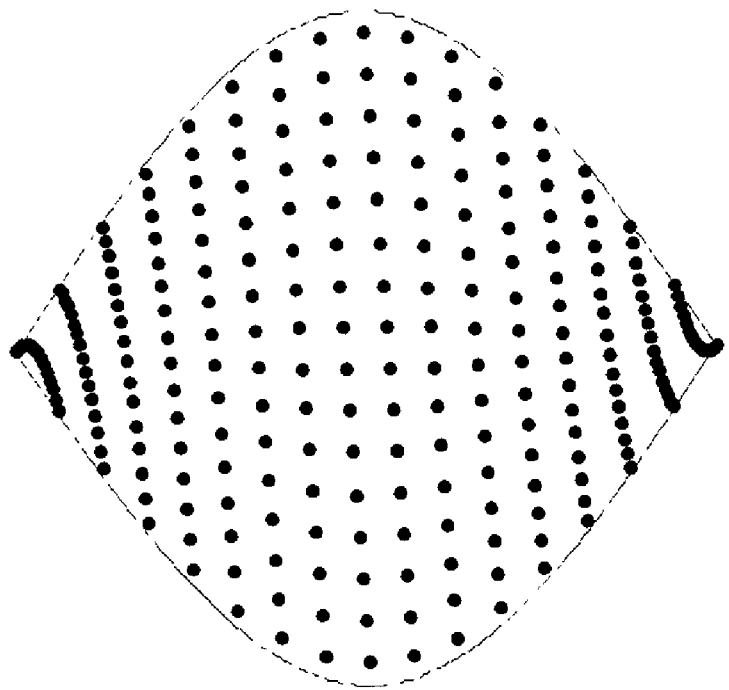
FIGS. 4A and 4B are illustrations of image capture locations for an anisotropic spiral sampling strategy.
Figure 4A:
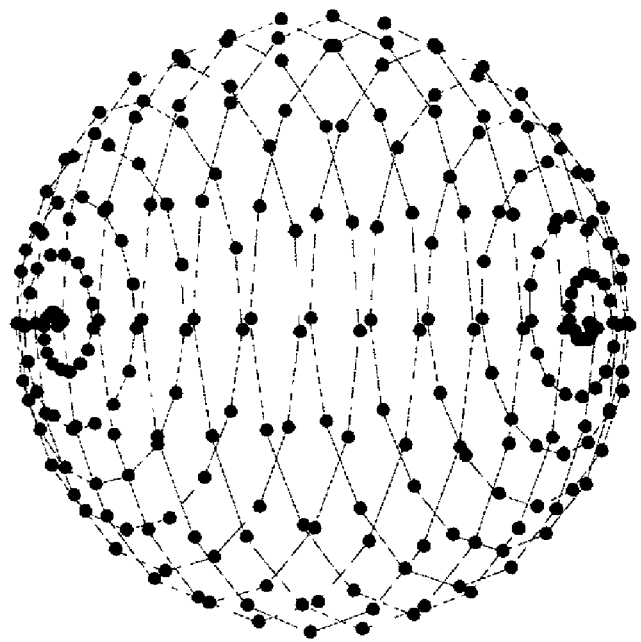

FIG. 4A and FIG. 4B show the resulting image capture locations with the same parameters as in FIG. 3A and FIG. 3B. As in FIG. 3A and FIG. 3B, FIG. 4A and 4B show the 3-D trajectory and the Sanson projection of the image capture points. The parameters used are: $(N_\theta, N_\phi) = (16, 16)$ and $(\theta_0, \phi_0) = (0, \pi/(2N))$. Thus, as for the slice sampling strategy, there are a total of 256 frames captured with this method.

Although simple, the slice sampling (Eqns. (1) and (2)) nor the above anisotropic spiral sampling (Eqns. (8) and (9)) provide equal viewing resolution everywhere (thus anisotropic). As shown in FIGS. 3A, 3B, 4A, and 4B, there are more image capture points close to the two poles. Thus, the viewing resolution is higher towards the two poles. Usually, a 3-D object to be imaged would need to be imaged isotropically throughout the imaging surface. There are no reasons to favor the two poles and capture more images there.

The unbalance in the viewing resolution (lower resolution towards the equator) is artificial and can be removed through a redesign of the scanning strategy. In the next section, an alternative scanning strategy is developed to equalize the viewing resolution throughout the spherical surface where all image capture locations lie.

3. Isotropic Spiral Sampling Strategy

The previous approach runs the two motors at constant speeds while capturing images equally spaced in time. As shown in FIGS. 3 and 4, the resulting image capture points are crowded near the two poles. However, if the images are captured more sparsely near the poles, one may still be able to obtain isotropic viewing resolution with the motor control equations given by Eqns. (6) and (7), i.e., by running the motors at constant speeds. Naturally, the image capture times, in this case, will not be equally spaced in time.

The determination of isotropic spiral scanning strategy begins with the usual parameterization of the two angles: (θ(t),φ(t)), 0≤t≤T, where t is time whose extent is [0, T]. Assuming that the radius of the sphere enclosing the object is R, and that the image capture points lie on this sphere, the differential change in the camera path can be expressed as:

$$dr = \theta R \sin \phi d\theta + \phi R d\phi \quad (10)$$

where
- r: camera position
- dr: differential change in the camera position
- ($\theta,\phi$): camera angles, as previously defined (see FIG. 1)
- ($\hat{\theta},\hat{\phi}$): corresponding unit vectors Note that the position vector r always stays on the sphere of radius R, according to Eqn. (10).

One approach would be to keep the differential distance dr (vector) to be constant in the parameter t, and sample the camera position vector r at equal intervals of the parameter t. Then, adjacent capture locations will be "equally spaced" along the path. However, the spacing along the vertical direction, $\phi$, may differ depending on the actual angle $\phi$. That is, the spacing along the vertical direction would vary as sin($\phi$). Thus, designing the differential distance dr to be constant in t will not provide isotropic image capture points. An alternative solution is sought.

Due to its simple implementation, the following constant motor control is used:

$$\theta(t) = \theta_o + \frac{2\pi t}{T_\theta}, 0 \le t \le T \quad (11)$$

$$\phi(t) = \phi_o + \frac{\pi t}{T}, 0 \le t \le T \quad (12)$$

where as before, T and $T_\theta$ are the times taken for the camera to rotate one revolution in directions $\phi$ and $\theta$, respectively. The substitution of the above into Eqn. (10) yields $$dr = \hat{\theta} R \frac{2\pi}{T_\theta} \sin\left(\phi_o + \frac{\pi t}{T}\right) + \hat{\phi} R \frac{\pi}{T} \quad (13)$$

By design, the motor controlling $\theta$ turns much faster than that of the motor controlling $\phi$, as is clear from Eqns. (11) and (12). Thus, for nominal values of t and the initial $\phi_0$, it is assumed that the component along $\hat{\phi}$ is negligible. Thus, the following approximation is used:

$$dr \approx \hat{\theta} R \frac{2\pi}{T_\theta} \sin\left(\phi_o + \frac{\pi t}{T}\right) \quad (14)$$

Integration of the above yields the following arc length, which is essentially the distance traveled by the camera.

$$s(t) = R \frac{2\pi}{T_\theta} \int_{\xi=0}^{t} \sin\left(\phi_o + \frac{\pi \xi}{T}\right) d\xi \quad (15)$$

$$= \frac{2RT}{T_\theta}\left(\cos(\phi_o) - \cos\left(\phi_o + \frac{\pi t}{T}\right)\right)$$

Thus, the total distance traveled by the camera (from t=0 to t=T) becomes:

$$S = s(T) = \frac{2RT}{T_\theta}(2\cos(\phi_o)) \quad (16)$$

As the goal is to sample the camera trajectory equally spaced apart, the total distance above divided by the total number of frames captured N (minus 1) is set to the spacing between the image capture points. Thus, the image capture points can be expressed as:

$$s_k = \frac{2RT}{T_\theta}(2\cos(\phi_o))\frac{k}{N-1}, k = 0, 1, 2, K, N-1 \quad (17)$$

Upon equating Eqns. (15) and (17), and solving for the capture time results in the following:

$$t = \frac{T}{\pi}\left(\cos^{-1}\left(\cos(\phi_o)\left(1 - \frac{2k}{N-1}\right)\right) - \phi_o\right), k = 0, 1, K, N-1 \quad (18)$$

The capture time t and the index k are related though the relationship t=kT/(N−1). Moreover, note that N may be used as a parameter that can be selected by the user to control the viewing resolution. Keeping the viewing resolution of the previous approaches (FIGS. 3A, 3B and FIGS. 4A, 4B) at $\phi=\pi/2$, the following may be set $$N = \left[\frac{2N_\theta N_\phi}{\pi}\right] \quad (19)$$

where [·] denotes the rounding operation. Recall that for the previous two approaches, the total number of images captured, N≈$N_\theta N_\phi$. The isotropic spiral sampling strategy approach captures a smaller number of frames, reduced by the factor $\pi/2$. This reduction came at the cost of capturing less number of frames near the two poles, where other approaches unnecessarily captures too many.

Figure 5B:
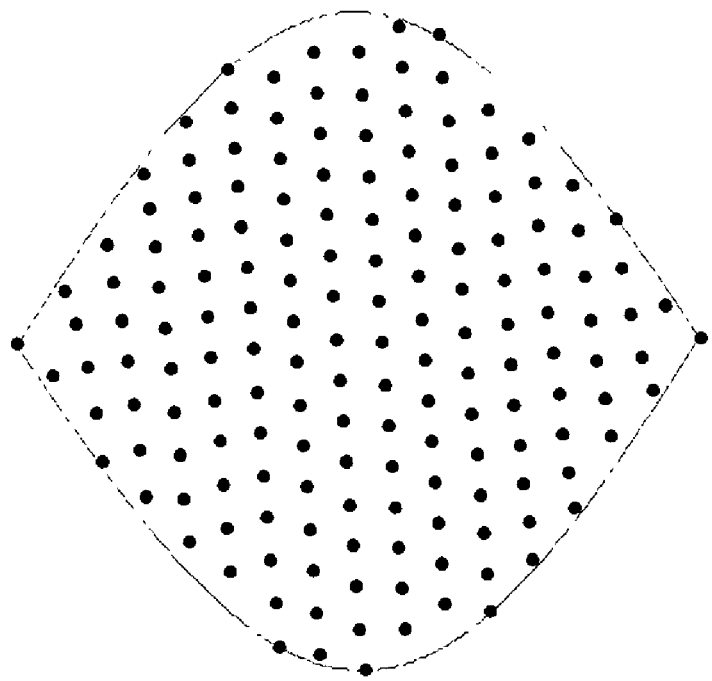
FIGS. 5A and 5B are illustrations of image capture locations for an isotropic spiral sampling strategy.
Figure 5A:
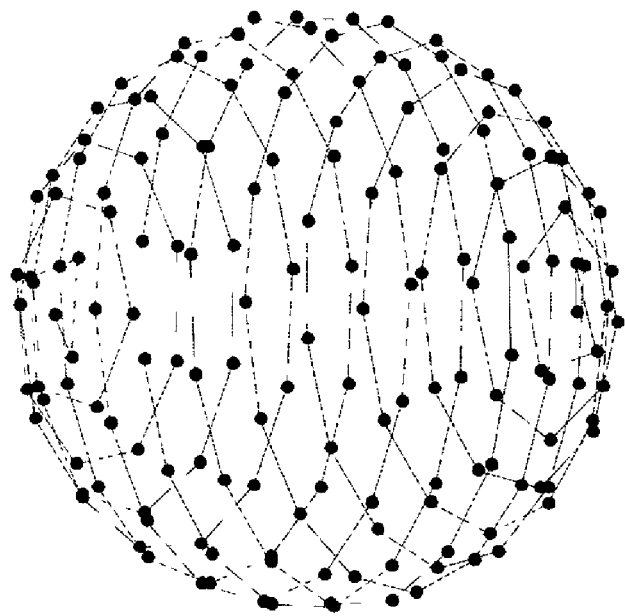

FIG. 5A and FIG. 5B show the resulting image capture locations. Note that the capture positions are equally spaced visually, which in effect offers isotropic viewing resolution. As in FIGS. 3A, 3B, 4A, 4B, FIG. 5A shows the 3-D trajectory (line), which is marked (dots) with all image capture locations, and FIG. 5B shows all capture locations mapped using the Sanson projection (see text). The parameters used are: ($N_\theta,N_\phi$)=(16,16) and ($\theta_0,\phi_0$)=(0,$\pi/(2N_\theta N_\phi)$). In contrast to the previous approaches, there are a total of 163 (=N=[$2N_\theta N_\phi/\pi$]) frames captured with this method. Notice the isotropic viewing resolution and the reduction in the total number of captured frames by the factor $\pi/2$ (≈256/163).

4. Image Capture and Frame Tagging

Whichever approach is used to capture the image sequence, the image acquisition device will store the following into a centralized (or distributed) database for later access over the network:

Image sequence f(k),k=0,1, K,N−1, namely the compressed video

Corresponding $\theta_k$ and $\phi_k$, k=0,1, K,N−1

Note that all frames are, in effect tagged with the capture locations $\theta_k$ and $\phi_k$.

Figure 6:
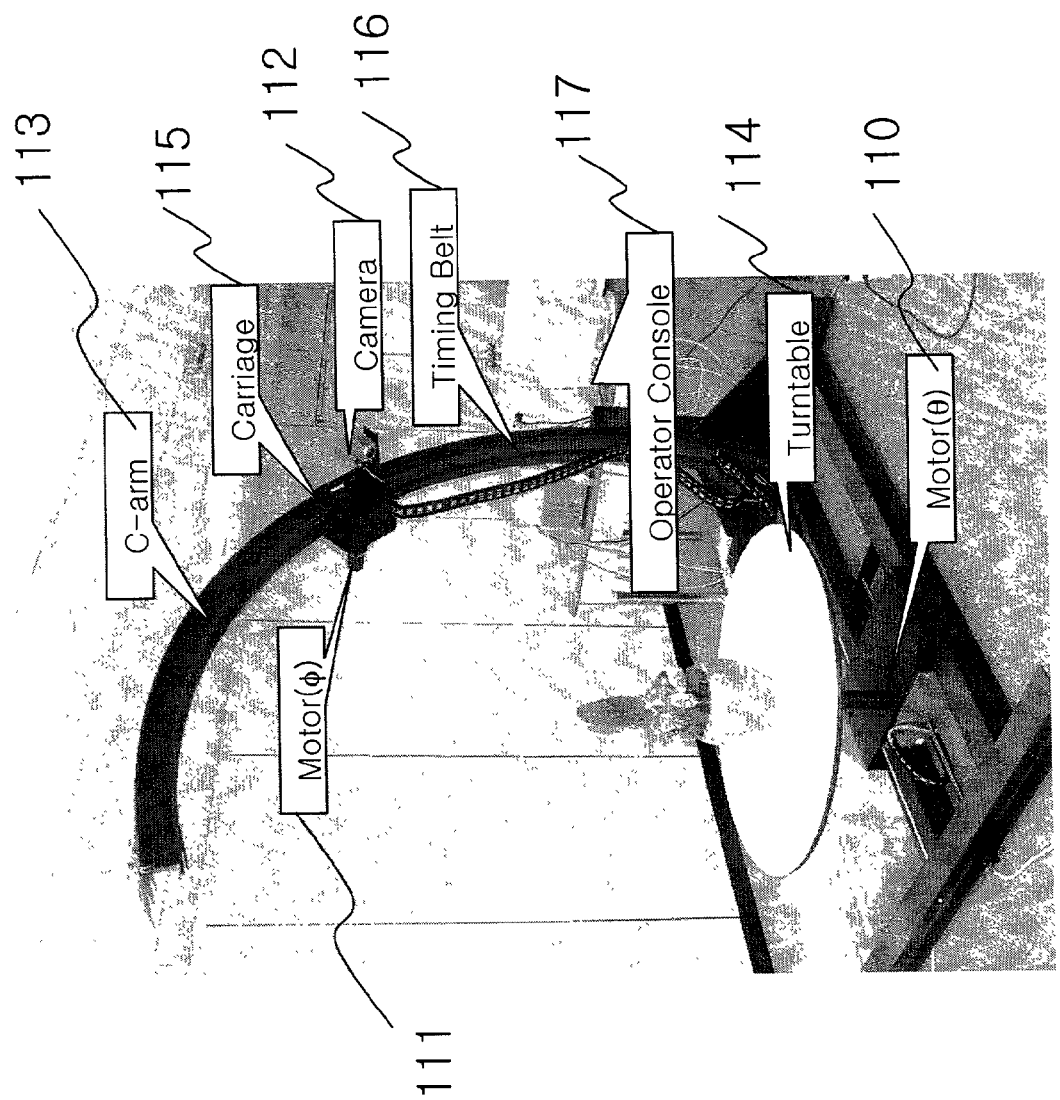
FIG. 6 is a photograph of a 3-D imaging capture system.

FIG. 6 is a photograph of the 3-D image capture hardware of the present invention. The two motors 110, 111 control the two angles that determine that position of the camera 112. The camera moves along the vertical C-arm 113 (direction $\phi$) while the turntable 114 controls $\theta$. Thus, the device captures the image sequence while recording the two angles, $\theta$ and $\phi$, generated by the two encoders attached to the two motors. The carriage 115, which is powered by a motor, moves along the vertical C-arm equipped with a timing belt 116. The two motors 110, 111 controlling θ (turntable) and φ (camera carriage) are pre-programmed from the operator console 117 (PC) to run in a prescribed manner.

5. The 3-D Image Editor

Figure 7:
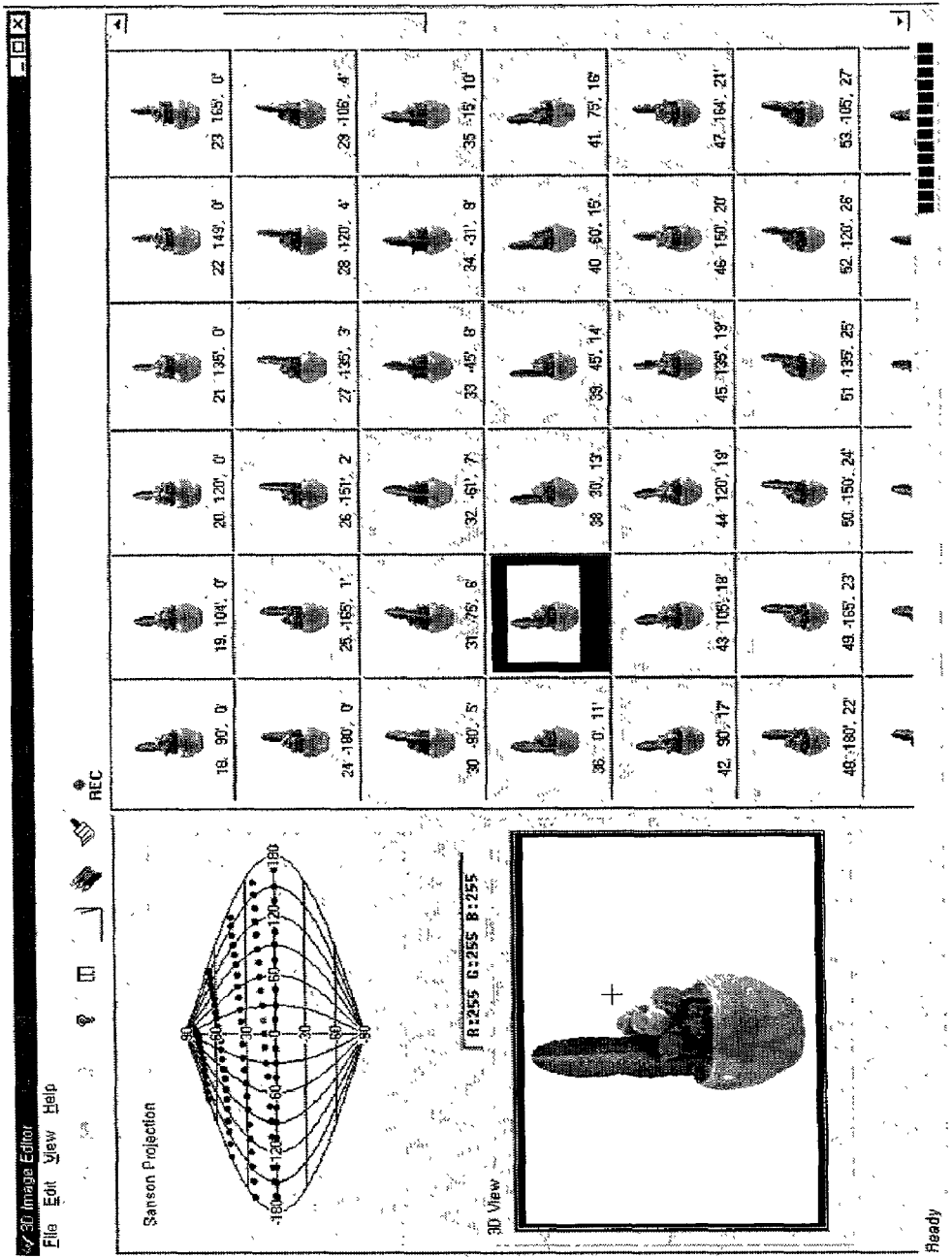
FIG. 7 is a screen showing the main window of the 3-D image editor software.

After the capture of the image sequence f(k), k=0,1,K, N−1, the captured 3-D image may be edited for various manual adjustments such as background removal, addition/deletion of frames, color correction, unsharp masking, etc. FIG. 7 shows the 3-D image editor. The editor has three main panes: the Sanson projection pane (top left) shows the actual image capture positions (dots) using the Sanson projection; the 3-D view pane (bottom left), the 3-D view of the captured images; and the thumbnail pane, shows all images captured. The three panes are interconnected. For instance, upon a user clicking a dot on the Sanson projection, the color of the dot changes. In addition, on the 3-D view pane, the corresponding image is displayed and on the thumbnail pane the corresponding image is highlighted. Similar action on other panes (3-D view and thumbnail panes) will result in corresponding refresh of all the panes.

B. THE 3-D VIEWER (3-D PLAYER

1. Generation of the Look-up-table

The individual images (video frames) are tagged with corresponding view angles (θ,φ) at the time of the image capture. For efficient operation, the 3-D viewer must generate the look-up-table LUT(θ,φ) that maps the view angle, (θ,φ), to the frame number. The amount of time required for this operation is minimal and can even be performed while the image data is being transferred from the server. The LUT may be constructed as follows.

The LUT of the size $L_\theta \times L_\phi$ is filled one at a time as follows:

$$\text{Initialize } LUT(i, j) = -1, \text{ for all } (i, j) \quad (20)$$

$$\text{Loop over } k = 0, 1, K, N - 1$$

$$LUT\left(\left\lfloor \frac{\theta_k}{2\pi} L_\theta \right\rfloor, \left\lfloor \frac{\phi_k}{\pi} L_\phi \right\rfloor\right) = k$$

$$EndLoop$$

where $\lfloor \cdot \rfloor$ indicates the floor operation that maps real numbers to integers less than equal to the operand. As the above operation will undoubtedly leave "holes" (cells with "−1"), these holes are filled with the nearest frame number, for instance, via $$\text{Loop over all } (i,j) \text{ such that } LUT(i,j)=-1 \quad (21)$$

Find the nearest (i*,j*) such that LUT(i*,j*)≠−1
LUT(i,j)=LUT(i*,j*)
EndLoop

The concept of "nearest" frame number above may be taken to be the one with the smallest $l_2$-norm:

$$\|(\theta_k,\phi_k)-(\theta_{k^*},\phi_{k^*})\|_2^2 = (\theta-\theta_{k^*})^2 + (\phi-\phi_{k^*})^2 \quad (22)$$

where k=LUT(i,j) and k*=LUT(i*,j*) denote the corresponding frame numbers. The operation within the loop above may be performed via repeated use of the morphological operation "dilate". Note that other metrics or distances may also be used in finding the "nearest" cell.

Upon receipt of the user inputs, θ and φ, the 3-D viewer simply decompresses and displays the following frame number:

$$LUT\left(\left\lfloor \frac{\theta}{2\pi} L_\theta \right\rfloor, \left\lfloor \frac{\phi}{\pi} L_\phi \right\rfloor\right) \quad (23)$$

In vision applications the precision of the angle information (θ and φ) may be important. However, for the 3-D visualization application of the present invention, as long as the images captured are closely spaced, the accuracy of the two angles is not that critical, as the image display is purely for visualization purposes. Thus, displaying the nearest frame, i.e., the frame closest to the current (θ and φ), approximated through Eqn. (23) suffices.

2. Display of 3-D Objects by Random Access

The 3-D viewer is able to display the 3-D image sequence f(k),k=0,1, K,N−1, as the user clicks and drags the mouse across the displayed object. Initially, the user is presented simply with one of the images in the sequence. Upon a user mouse drag, the display is updated with the appropriate image according to a set of rules to provide realistic manipulation of the 3-D object. The manipulation of the displayed object will be based on either of the two modes: NEWS (north-east-west-south) and AVIATION. These two modes behave differently based on the same mouse action.

Figure 8B:
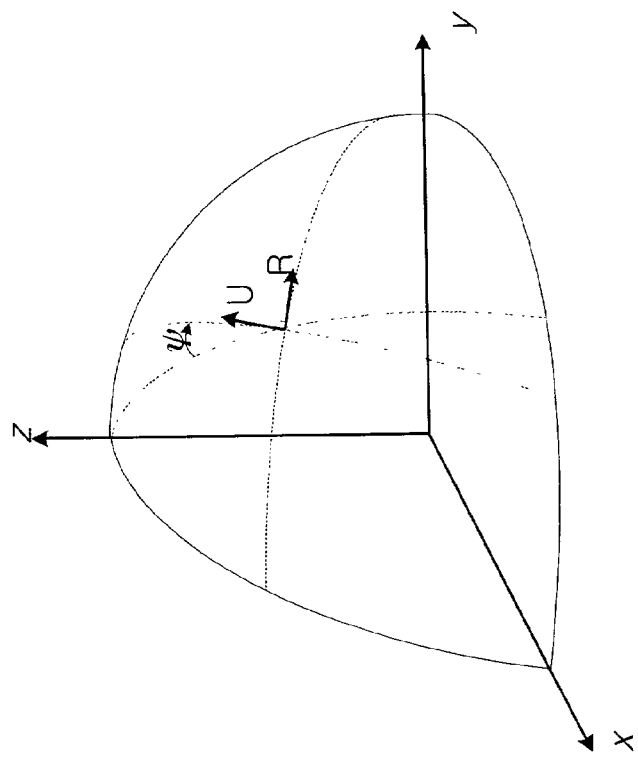
FIGS. 8A and 8B are illustrations of controls in the display software in the NEWS and AVIATION modes.
Figure 8A:
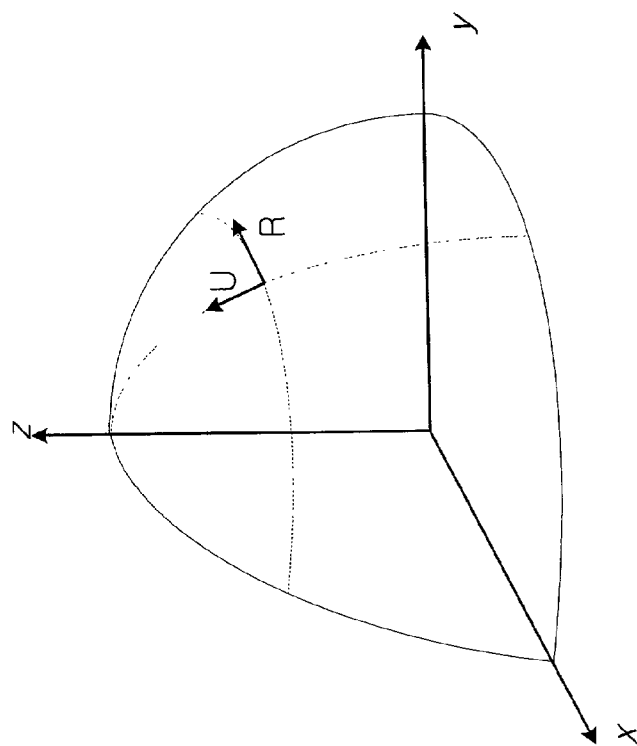

FIG. 8A shows the NEWS mode where a left (or right) drag rotates the object along the "west" (or "east") direction. A down (or up) drag will rotate the object along the "south" (or "north") direction. FIG. 8B shows the AVIATION mode where a drag along one direction will always correspond to a rotate along that direction. In other words, in the AVIATION mode, the mouse drag direction always corresponds to the direction of the two orthogonal great circles one of which coincides with the current direction of the object. Mathematically, the two operational modes can be summarized as follows.

Assume the current object direction with respect to the north pole to be ψ, and the user mouse drag of δR and δU. Then, for the NEWS mode the update equations become:

$$\theta_{new} = \theta_{old} + \delta R \quad (24)$$

$$\phi_{new} = \phi_{old} + \delta U \quad (25)$$

$$\psi_{new} = \begin{cases} \pi - \psi_{old}, & \text{if north or south pole was crossed} \\ \psi_{old}, & \text{else} \end{cases} \quad (26)$$

and for the AVIATION mode:

$$\theta_{new} = \theta(\theta_{old}, \phi_{old}, \psi_{old}) \quad (27)$$

$$\phi_{new} = \phi(\theta_{old}, \phi_{old}, \psi_{old}) \quad (28)$$

$$\psi_{new} = \psi(\theta_{old}, \phi_{old}, \psi_{old}) \quad (29)$$

In the AVIATION mode, there exists several possibilities for updating functions θ(·), φ(·) and ψ(·). In particular, the following north reference system may be applied, typically used in navigation systems.

$$\theta(\theta_{old}, \phi_{old}, \psi_{old}) = \theta_{old} + \delta R \cos \psi + \delta U \sin \psi \quad (30)$$

$$\phi(\theta_{old}, \phi_{old}, \psi_{old}) = \phi_{old} - \delta R \sin \psi + \delta U \cos \psi \quad (31)$$

$$\psi(\theta_{old}, \phi_{old}, \psi_{old}) = \psi_{old} \quad (32)$$

In both cases above, ψ, does not change through the mouse motion, the user must manually rotate the image to view at a desired rotation angle. Other possibilities exist as well. In FIG. 7, the lower left pane (3-D view pane) is the ActiveX control which implements the two 3-D object control approaches, NEWS and AVIATION modes.

To the web surfers only the ActiveX control (3-D view pane) is presented for viewing the 3-D object. In any case, for both modes, the image displayed is $f_\psi(LUT(\lfloor\theta L_\Theta/(2\pi)\rfloor, \lfloor\phi L_\phi/\pi\rfloor))$, where the subscript denote the image (object) rotation by the angle $\psi$. Thus, the 3-D viewer must support random access as well as rotation. The 3-D viewer also supports other usual functions such as zoom and pan.

3. Pre-decode for Fast Display

As the image sequence is encoded as a video, in order to facilitate real-time manipulation, pre-decode of certain frames must be performed a priori. For example, the MPEG standard encodes the video sequence as a group of pictures (GOP) unit. An instance of a GOP of 12 frames may be IBBPBBPBBPBB, where each character represents frame types. I-frames can be decoded independently; P-frames require decoding of previous anchor frame (I- or P-frame); and B-frames require decoding of two adjacent anchor frames.

As this particular application requires random access of an arbitrary frame within a GOP, decoding a particular frame within the GOP may require decoding several frames before and after the frame of interest. Of course, for playing the encoded sequence as a normal video, such problems do not exist as all frames are decoded in the natural order. The application of the present invention, however, must support frame decoding not necessarily in sequence.

For the GOP of IBBPBBPBBPBB, if just I-frames are decoded a priori, it may require up to four decodes for a random access of the last two B-frames. However, if all I- and P-frames are decoded in advance and reside in local memory, then one (or none) decode would be sufficient to display a particular frame within the GOP. This is precisely the approach that has been taken. That is, it has been opted to pre-decode all I- and P-frames into a local buffer, so that at most one (or none) decode is all that is required to view a particular frame. To save memory, the pre-decoded frames are losslessly encoded.

Another possibility would be to encode the sequence where GOPs are IBBBBBBBBBBB and decode the I-frame a priori. In this case, if all I-frames are decoded within the video, a random access of a particular frame would amount of one (or none) decode.

Those skilled in the art would appreciate that other compression algorithms such as H.261, H.263, and H.263+ may be used instead of MPEG.

4. Multimedia Streaming

The display software (an ActiveX Control) does not need to wait for all the data to be received before the display and manipulation of the 3-D object. As the data is transferred over the network, the display and manipulation can begin as soon as one or more frames have been received. The implemented software of the present invention first receives and decodes the file header including the number of frames, details of the GOP structure, bit rate, etc. As soon as all necessary information has been decoded, an independent thread (of lower priority) is activated to download the rest of the data. As the thread receives data, it communicates with the main display software as to which frames have or have not been received. As such, the transmission order of the MPEG sequence is altered to transmit all I-frames first, followed by P-, and then B-frames. Even within the same frame type, for instance I-frames, the more important frames are transmitted before the less important ones. As the frames are received, the software pre-decodes I- and P-frames. The received frames are flagged so that the display software is able to use the data as soon as it becomes available.

In addition to the 3-D data (video), the file also consists of other multimedia streams, such as the zoom data and other video data that can be downloaded at the user request. For instance, if the user wants a detailed (zoomed) view at a certain viewing angle, upon the user request, a download of a separate multimedia stream is initiated. Another instance may be a download of a particular video (an opening of a refrigerator door) upon user request.

To summarize, most existing 3-D visualization techniques require a two-step process. First, a model of the object is generated and then stored. When the user request a view of the object at a particular view angle, the image must be rendered based on the model before being presented to the user. It is this image rendering process that prohibits the user from manipulating complex and natural objects in real-time. In the approach of the present invention, the model generation as well as the image rendering steps has been eliminated. As such, visualization and manipulation of 3-D objects can be performed in real-time over the network using an ordinary PC as a client.

C. 3-D IMAGING CENTER

Figure 9:
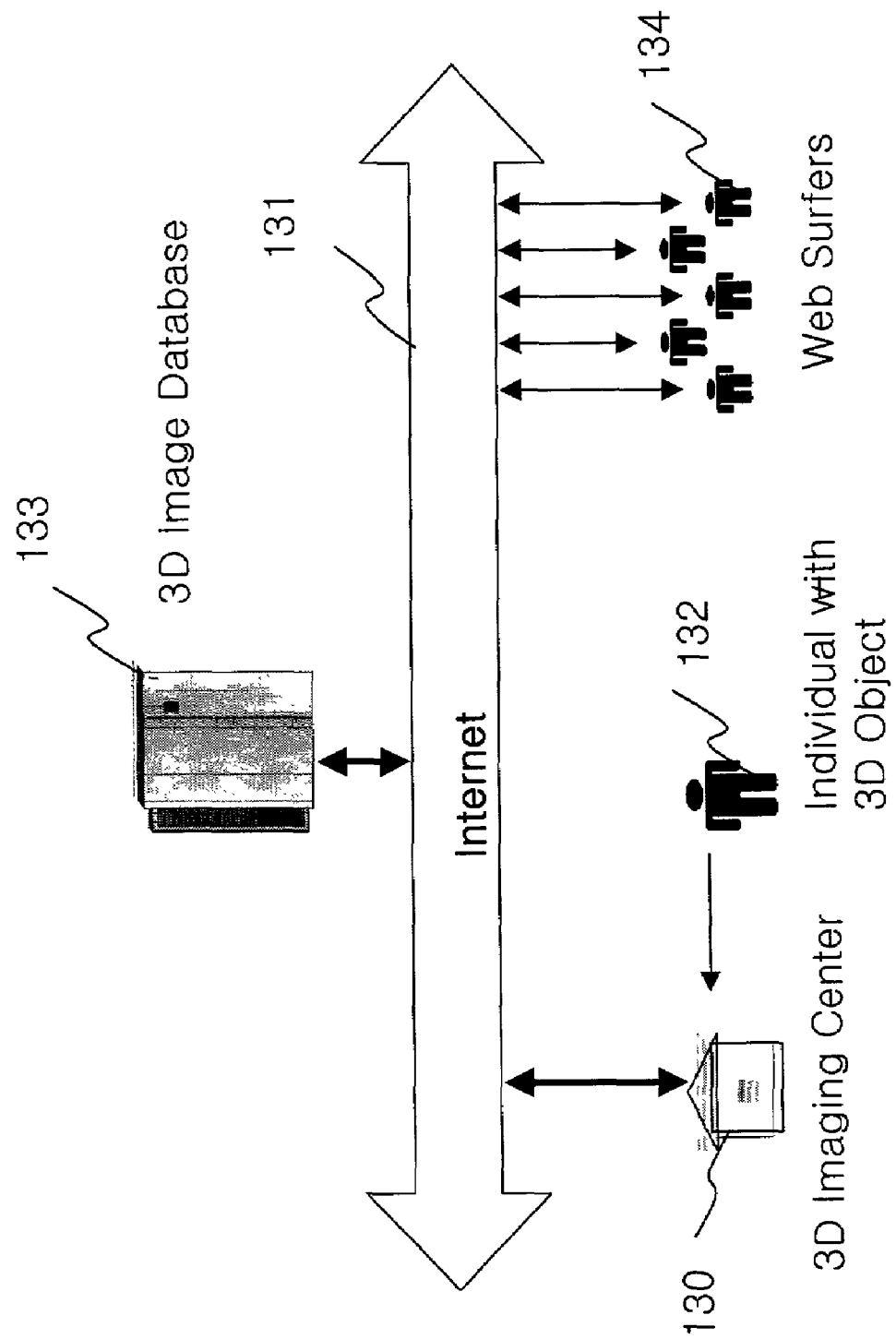
FIG. 9 is a process chart for a one-stop service for 3-D imaging and visualization.

FIG. 9 shows the process chart of the one-stop service for 3-D content management approach. It includes the 3-D imaging center 130 equipped with 3-D image capture device, a server, and a connection to the Internet 131. An individual 132 personally visits the 3-D imaging center 130 with the real 3-D object to be imaged (or send the object). Upon imaging the real 3-D object from all possible view angles, be it slice or spiral sampling, the image sequence is stored in to a centralized (or distributed) database 133. The individual leaves the imaging center with a URL of a file containing the 3-D content.

The individual may then publish the URL on his/her web so that web surfers 134 have access to the 3-D content. Even without publishing the URL at a particular Web page, he/she may still view the 3-D object simply by typing the URL into the Web browser. The URL of the 3-D content may or may not be password protected. Clients of such 3-D imaging center includes both large and small corporations, as well as private individuals with a need to display objects in 3-D over the Internet. The system of the present invention can be used by non-technical individuals as the system has eliminated all technical details that today's user must learn in order to provide such 3-D visualization of real 3-D objects.

The visualization and manipulation of 3-D object has not received the popularity that images and videos have. Perhaps, it is due to the fact that most individuals wishing to display a 3-D object over the Web needs to get over the steep learning curve for including a 3-D object on a home page. The concept of one-stop service for 3-D object management approach in accordance with the present invention will essentially eliminate this steep learning curve for individuals and professionals with 3-D content (objects) to be shown on Web pages.

D. SYSTEM IMPLEMENTATION

Figure 10:
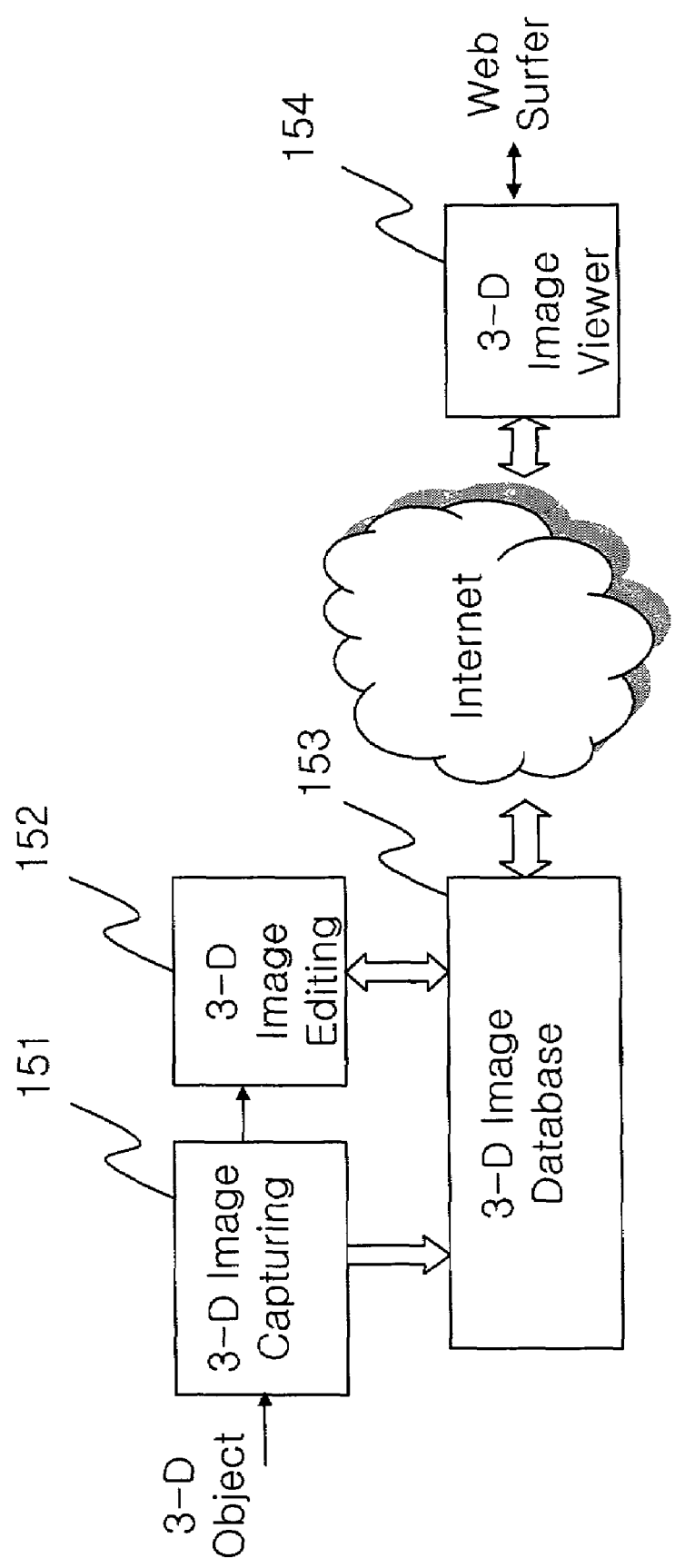
FIG. 10 is a block diagram of the system offering a total service for 3-D visualization over the Internet.

FIG. 10 shows a block diagram of the system offering a total service for 3-D visualization over the Internet. The 3-D object is first imaged by the 3-D Image Capture System 151. The captured 3-D content may then be stored into the 3-D Image Database 153, or it may be edited by the 3-D Image Editor 152. In any case, the 3-D content is eventually stored into the 3-D Image Database 153. The 3-D content may then be published through its assigned URL, which may or may not be password protected. Once published, any web surfer can view the image through the 3-D Image Viewer 154. The software implementation of the first three modules (151, 152 and 153) is relatively straightforward.

Figure 11:
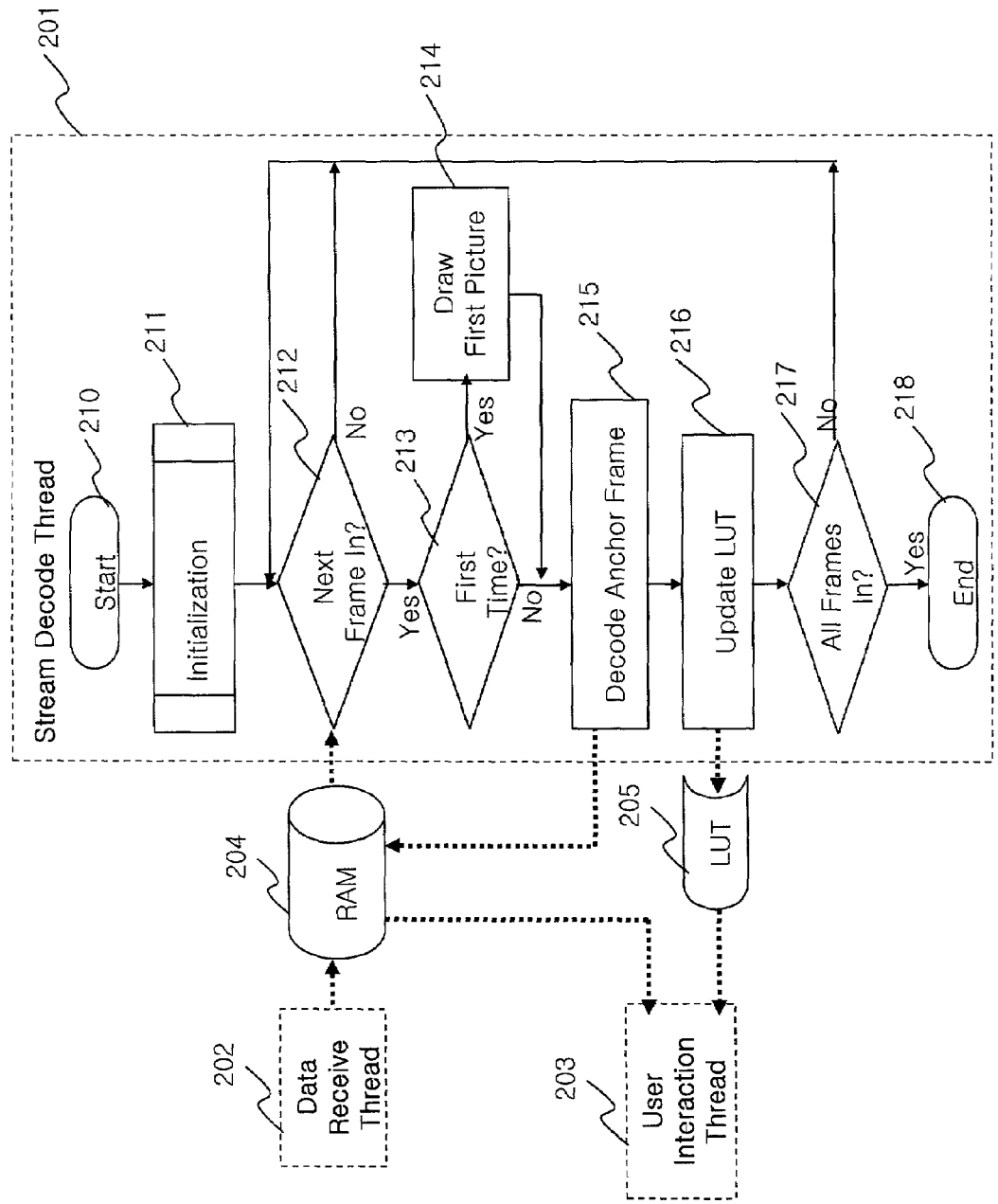
FIGS. 11 and 12 are the flowchart of the software that implements the 3-D Image Viewer.
Figure 12:
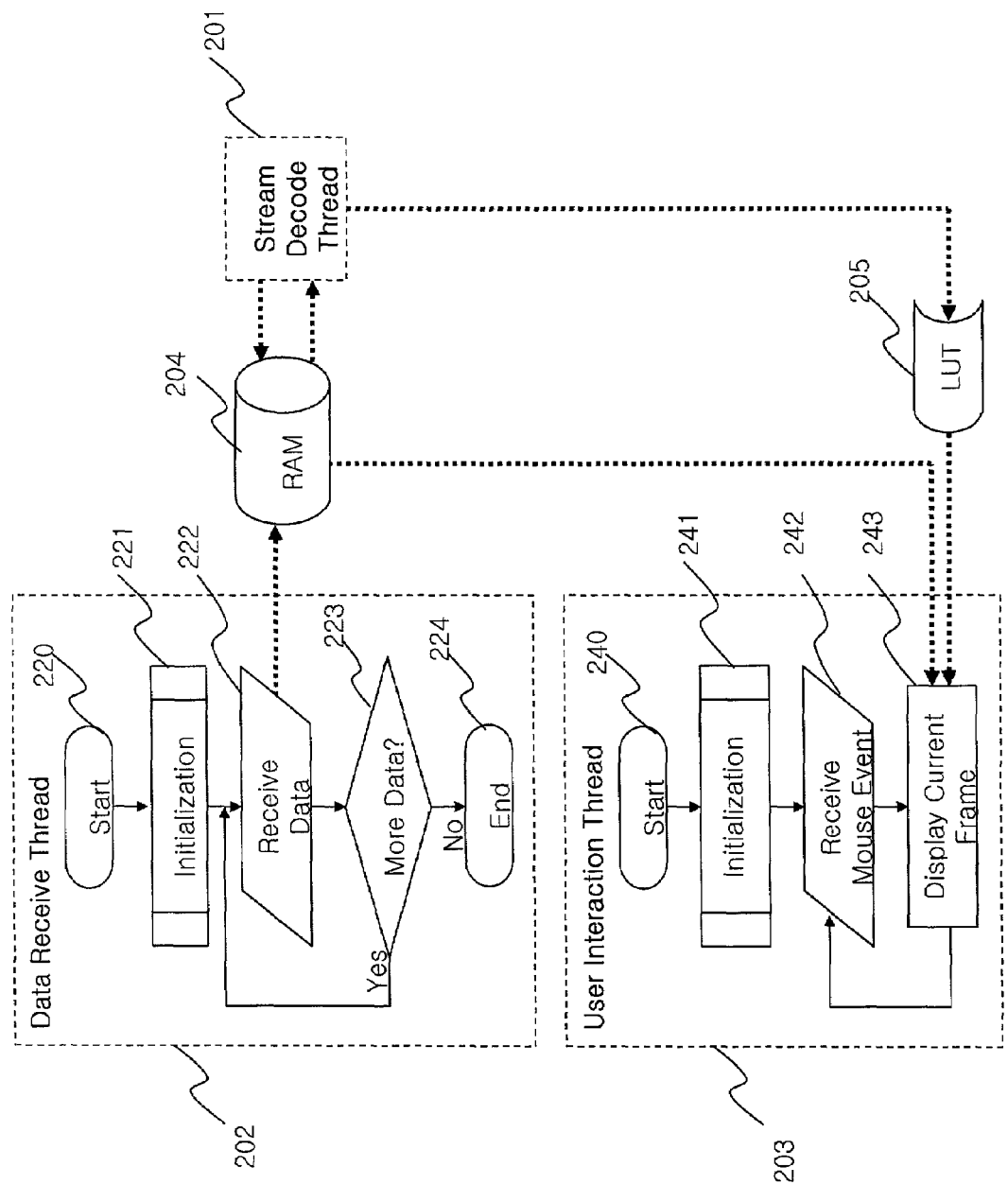

FIGS. 11 and 12 show the flowchart of the software that implements the 3-D Image Viewer 154. The software consists of three main threads: Stream Decode, Data Receive and User Interaction threads. FIG. 11 shows the Stream Decode Thread and FIG. 12 shows the other two threads.

At the start (210) of the Stream Decode thread 201, step (211) initializes various arrays and internal variables. In step (212), it waits for the next frame. Once the frame has been received (Data Receive thread 202 sets an appropriate variable in the RAM 204), the control is moved to step (213). In step (213), if the frame received is the very first frame within the image sequence (3-D content), it outputs the frame onto the user screen. If not, the control is moved to the next step. In step (215), the anchor frames (e.g., I and P frames of MPEG) are pre-decoded and stored (dotted arrow) in the RAM (heap). In step (216), the look-up-table 205 (LUT, previously described) is updated to facilitate fast random access by the User Interaction Thread 203. In step (217), the thread exits to an end (218) if all frames have been received. If not, the control goes back and waits for the next frame.

The Data Receive thread 202 after a start 220 initializes various arrays and internal variables in step (221). As the data over the Internet is received in packet units, step (222) captures and stored the received data into the RAM. It also keeps track of the number of frames received for the previous Stream Decode thread. Step (223) checks to see if there are more data to be received. If there are more data to be received, then it loops back to step (222) and if not, the thread exits to an end 224.

The User Interaction thread 203 initializes, after a start 240, various arrays and internal variables in step (241). As the user of the 3-D Viewer drags the mouse, the mouse action is processed in step (242). The actual mouse drag ($\delta U, \delta R$) is used to compute the current frame number using the LUT. Using the current frame number along with the pre-decoded anchor frame data in the RAM, the current frame is displayed in step (243). The process of receiving mouse event (242) and displaying the frame (243) is repeated until the user quits the 3-D Viewer program.

In summary, it is the User Interaction thread that receives and processes the mouse actions. As such, it is run at the highest priority. The Data Receive thread independently receives the data over the Internet. As more data (frame) is received, the User Interaction thread is able to display more and more frames. The Stream Decode thread simply updates the look-up-table (LUT) and decodes the anchor frames as frames are received to facilitate fast refresh of the user display. Thus, through this design, users can manipulate the 3-D object in real time (20–30 frames per second) and more importantly, users do not have to wait until all data has been received.

E. INPUT MEANS OTHER THAN CAMERA

The aforementioned visualization technique is not limited to images of real objects captured by a physical camera. One could easily conceive a virtual camera "capturing" images from a 3-D model (e.g., mesh or triangulation) or a 3-D volume data set (e.g., 3-D medical images). The 3-D model within a generic CAD (computed aided design) program could easily be used to generate a sequence of images, each tagged by azimuth and elevation angles $\theta$ and $\phi$.

Similarly, a 3-D volume data set obtained by conventional medical scanners, such as positron emission tomography (PET), single positron emission computed tomography (SPECT), X-ray computed tomography (CT), ultrasound, and magnetic resonance imaging (MRI), may also be used to generate a sequence of 2-D images, each tagged by azimuth and elevation angles $\theta$ and $\phi$. The way in which the images are captured would of course depend upon the particular system under consideration.

Taking the 3-D CT volume data set, for instance, of a human body, the 3-D volume can be projected to generate a set of 2-D images at a set of view angle $\theta$ and $\phi$. The projection techniques are well known to those skilled in the art, which include: the maximum intensity projection (MIP), the minimum intensity projection (MinIP), the radiographic projection, the volume rendering and the surface rendering techniques. In these projection techniques, typically, a ray is cast through the 3-D volume data at the angle $\theta$ and $\phi$ and the resulting pixel value at the 2-D image is: the maximum pixel value (MIP) of all pixels on the ray, the minimum pixel value (MinIP) of all pixels on the ray, the average pixel value (radiographic) of all pixels on the ray, a function of the emittance and luminance (volume rendering) of all pixels on the ray, and finally a function of orientation of the first surface on the ray with respect to one or several virtual light sources (surface rendering).

Even for the case of generating 2-D images from 3-D models, for instance, using a CAD program, the rendering can be performed for a set of view angles $\theta$ and $\phi$.

Thus, using these approaches, be it using a 3-D volume data (as in medical images) or a CAD program, one can generate a sequence of 2-D images, each tagged with the view angle $\theta$ and $\phi$. As such, the previous discussion on 3-D visualization of natural objects is fully applicable to medical data as well as the CAD data, since both approaches are able to generate a sequence of 2-D images with all frames (images) tagged with the view angles $\theta$ and $\phi$. Furthermore, the sequence can be compressed, stored and viewed in 3-D at a desired time. For compression, as for real objects, encoding schemes such as MPEG, Motion JPEG, H.261, H.263 and H.263+ may be used.

While the invention has been described with reference to preferred embodiments, it is not intended to be limited to those embodiments. It will be appreciated by those of ordinary skilled in the art that many modifications can be made to the structure and form of the described embodiments without departing from the spirit and scope of this invention.

What is claimed is:

1. A method of visualizing a desired view of an object by a user using a computer, comprising the steps of:
   capturing the images of the object as a sequence of images according to an image capturing sequence;
   encoding the sequence of images as video having video frames, each video frame tagged with viewing angle information of the corresponding image; and
   visualizing the object by displaying the frame substantially corresponding to the user's desired view angle.

2. The method of claim 1, wherein the step of visualization includes the step of pre-decoding the video for real-time display.

3. The method of visualizing a desired view of an object by a user using a computer, comprising the steps of:
   capturing images of the object as a sequence of images according to an image capturing sequence;

encoding the sequence of images as video having video frames, each video frame tagged with viewing angle information of the corresponding images; and visualizing the object by displaying the frame substantially corresponding to the user's desired view angle, wherein the step of capturing is performed by taking samples of the taking samples of the images of the object from a viewing angle of an azimuth angle θ and an elevation angle ø in the spherical coordinates.

4. The method of claim 3, wherein the video frames are tagged with θ and ø.

5. The method of claim 3, wherein the step of taking samples uses a slicing sampling technique where a series of samples are taken with θ updated in constant steps and with ø fixed before another series of samples are taken with the updated ø.

6. The method of claim 3, wherein the step of taking samples uses an anisotrophic spiral sampling technique, where a series of samples are taken with θ and ø changed in constant steps.

7. The method of claim 3, wherein the step of taking samples uses an isotrophic spiral sampling technique, where a series of samples are with θ and ø changed so that the distance between two adjacent samples is substantially equal.

8. The method of claim 3, wherein the video is streamed so that the visualization can start as soon as one or more frames have been received.

9. The method of claim 3, wherein the step of encoding includes the step of compressing the video.

10. The method of claim 9, wherein the step of compressing uses MPEG.

11. The method of claim 9, wherein the step of compressing uses H.261.

12. The method of claim 9, wherein the step of compressing uses H.263.

13. The method of claim 9, wherein the step of compressing uses H.263+.

14. The method of claim 3, wherein the step of visualization includes the step of pre-decoding the video for real-time display.

15. The method of claim 3, wherein the step of visualizing the object includes the step of streaming the most important frames first.

16. The method of claim 3, further including the step of editing the captured images before encoding.

17. The method of claim 3, further comprising the step of manipulating the viewing angle of the object while visualizing the object.

18. The method of claim 17, wherein the step of manipulating includes the step of rotating the object.

19. The method of claim 17, wherein the step of manipulating includes the step of zooming the object.

20. The method of claim 17, wherein the step of manipulating includes the step of manipulating the object in the NEWS (north-east-west-south) mode, where the object is rotated along the east-west direction or along the north-south direction.

21. The method of claim 17, wherein the step of manipulating includes the step of manipulating the object in the AVIATION mode, where the object is rotated along the direction of the two orthogonal great circle of a sphere having the object at the center.

22. The method of claim 3, further comprising the step of storing the image sequence in a database.

23. The method of claim 22, wherein the database is a centralized database.

24. The method of claim 22, wherein the database is a distributed database.

25. The method of claim 22, wherein the database is accessed through a network.

26. The method of claim 25, wherein the network is the Internet.

27. The method of claim 26, further comprising the step of publishing the URL corresponding to the location of the image sequence within the database.

28. The method of claim 27, wherein the URL is password protected.

29. The method of claim 3, wherein the step of visualization including the step of downloading a separate multimedia stream.

30. The method of claim 29, wherein the separate multimedia stream includes zoom data requested by the user.

31. The method of claim 29, wherein the separate multimedia stream includes other related data requested by the user.

32. The method of claim 31, wherein the related data is video.

33. The method of claim 31, wherein the related data is still images.

34. The method of claim 31, wherein the related data is sound.

35. The method of claim 31, wherein the related data is coordinates of points on the object.

36. A system of visualizing a desired view of an object by a user using a computer, comprising the steps of:
   an image capture device for capturing images of the object as a sequence of images;
   an encoder for encoding the sequence of images as video having video frames,
   each video frame tagged with viewing angle information of the corresponding image; and
   a visualizer for visualizing the object in 3-D by displaying the frame substantially corresponding to the user's desired view angle.

37. The system of claim 36, wherein the image capture device includes a camera.

38. The system of claim 37, further comprising a database for the image sequence in a database.

39. The system of claim 38, wherein the database is a centralized database.

40. The system of claim 38, wherein the database is a distributed database.

41. The system of claim 38, further comprising a network for access the database.

42. The system of claim 41, wherein the network is the Internet.

43. A system of visualizing a desired view of an object by a user using a computer, comprising the steps of:
   an image capture device for capturing images of the object as a sequence of images;
   an encoder for encoding the sequence of images as video having video frames, each video frame tagged with viewing angle information of the corresponding image; and
   a visualizer for visualizing the object in 3-D by displaying the frame substantially corresponding to the user's desired view angle,
   wherein the image capture device has means for taking samples of the images of the object from a viewing angle of an azimuth angle θ in the horizontal plane and an elevation angle ø from the horizontal plane.

44. The system of claim 43, wherein the video frames are tagged with θ and ø.

45. The system of claim 43, wherein the video is streamed so that the visualization can start as soon as one or more frames have been received.

46. The system of claim 43, wherein the encoder includes a video compressor for compressing the video.

47. The system of claim 46, wherein the video compressor is an MPEG encoder.

48. The system of claim 46, wherein the video compressor is an H.261 encoder.

49. The system of claim 46, wherein the video compressor is an H.263 encoder.

50. The system of claim 43, wherein the visualizer includes a look-up-table (LUT) for mapping the view angle to a frame number.

51. The system of claim 43, wherein the visualizer includes a pre-decoder for pre-decoding the video for fast retrieval.

52. The system of claim 43, further including an editor for editing the captured images after encoding.

53. The system of claim 43, wherein the visualizer includes means for manipulating the object while visualizing.

54. A method for enabling a user to visualize a desired view of an object, comprising the steps of:
capturing the images of the object as a sequence of images according to a particular image capturing sequence;
encoding the sequence of images as video having video frames, each frame tagged with viewing information of the corresponding image;
storing the video in a database; and
sending the video at the request of the user over a network.

55. The method of claim 54, wherein the video is encoded using MPEG.

56. The method of claim 54, wherein the network is the Internet.

57. The method of claim 54, further comprising the steps of:
receiving the video by a user; and
visualizing the object by displaying the frame substantially corresponding to the user's desired view angle.

58. A method of visualizing 3-D volume data of an object, comprising the steps of: capturing the 3D volume data as a stack of 2D tomographic images of the object; obtaining a sequence of projected 2D images by projecting the 3D volume data at prescribed azimuth and elevation angles; encoding the sequence of projected 2D images wherein each images are tagged with azimuth and elevation angles; storing the sequence of 2D images; and viewing the object in 3-D by random access of stored 2D image sequence.

59. The method of claim 58 wherein the step of capturing the 3D volume data uses positron emission tomography (PET).

60. The method of claim 58, wherein the step of capturing the 3D volume date uses single positron emission computed tomography (SPECT).

61. The method of claim 58, wherein the step of capturing the 3D volume data uses X-ray computed tomography (CT).

62. The method of claim 58, wherein the step of capturing the 3D volume data uses ultrasound imaging.

63. The method of claim 58, wherein the step of capturing the 3D volume data uses magnetic resonance imaging (MRI).

64. The method of claim 58 wherein the step of encoding includes video encoding using MPEG.

65. The method of claim 58, wherein the object includes human bodies.

66. The method of claim 58, wherein the object includes biological tissues.

67. The method of claim 58, wherein the object includes organic materials.

68. The method of claim 58, wherein the object includes inorganic materials.

69. The method of claim 58, further comprising the step of manipulating the object.

70. The method of claim 69, wherein the step of manipulating includes the step of rotating the object.

71. A method of visualizing 3-D volume data of an object, comprising the steps of: obtaining a sequence of 2D images at prescribed azimuth and elevation angles rendered by a CAD program; encoding the sequence of 2D images where each images are tagged with azimuth and elevation angles; storing the sequence of 2D images; and viewing the object in 3-D by random access of stored 2D image sequence.

72. The method of claim 71, wherein the step of encoding includes video encoding using MPEG.

73. The method of claim 71, further including the step of manipulating the object.

74. The method of claim 73, wherein the step of manipulating includes the step of rotating the object.

75. A method of providing a customer with a one-stop service for 3-D visualization of a real object over the Internet, comprising the steps of: receiving the object from the customer; capturing images of the object as a sequence of images each images tagged with an azimuth angle $\theta$ and an elevation angle $\phi$ in the spherical coordinates; and storing the image sequence in a database for transmission over the Internet at the request of a user.

76. The method of claim 75, wherein the image sequence is assigned a URL for a user of the Internet to access the image sequence.

77. The method of claim 76, wherein the accessed image sequence is used to view the object in 3-D by the user.

78. The method of claim 76, wherein the accessed image sequence is used to manipulate the object in 3-D by the user.

79. The method of claim 75, wherein the image sequence is encoded as video.

80. The method of claim 79, wherein the video encoding uses MPEG.

* * * * *